United States Patent [19]

Johnson et al.

[11] 4,014,621
[45] Mar. 29, 1977

[54] GAUGE

[75] Inventors: Ray W. Johnson; David L. Gordon, both of Wichita, Kans.

[73] Assignee: David L. Gordon, Wichita, Kans.

[22] Filed: Jan. 22, 1976

[21] Appl. No.: 651,415

[52] U.S. Cl. .................................. 408/16; 33/173; 33/185 R; 90/11 E; 90/DIG. 12

[51] Int. Cl.² ........................................ B23B 49/00

[58] Field of Search ............... 408/16, 14; 33/173, 33/185 R; 90/11 E, DIG. 12, 11

[56] References Cited

UNITED STATES PATENTS

| | | | |
|---|---|---|---|
| 1,361,470 | 12/1920 | Kling | 33/173 |
| 2,490,307 | 12/1949 | Karr | 408/16 |
| 2,658,283 | 11/1953 | Ciccone | 33/185 R |
| 3,724,964 | 4/1973 | Needham, Jr. | 408/14 |

*Primary Examiner*—Gil Weidenfeld
*Attorney, Agent, or Firm*—George B. White

[57] ABSTRACT

A gauge body with a longitudinal flat bottom adapted to be placed on a surface of one part of a machine; a longitudinal top surface on said gauge body, and a scale element longitudinally adjustably held to said top surface; a guide rail formed along one side of said gauge body and a longitudinal groove along said guide rail; spaced pointer members, each having a pointer body slidably fitting cross-sectionally over said guide rail and in said groove, and a pointer finger projecting from the pointer body over said scale element to indicate the distance adjustment between the pointer members; and a pointer extending over said scale element from another machine part moveable longitudinally relatively to said gauge.

7 Claims, 4 Drawing Figures

GAUGE

BACKGROUND OF THE INVENTION

There are various devices known in the prior art for measuring or limiting travel of moving parts, such as the quill stop and gauge in U.S. Pat. No. 3,724,963 of Stadtmuller, U.S. Pat. No. 2,898,685 granted to Nordquist, et al., or the setting or a boring bar in U.S. Pat. No. 3,323,221 of Koch; or the dial indicator in U.S. Pat. No. 3,224,104 of Platt, but each of such devices requires alterations or modifications of the machine parts and involves relatively complex structures.

The primary object of this invention is to provide a machinist gauge, which can be readily installed on a drill, a boring machine, or a milling machine, or the like, without the need of complex mechanisms, and the scale on which can be used with coacting pointers in adjustable positions, to visually observe the distance of relative movements of adjacent parts of such machines, with accuracy.

DETAILED DESCRIPTION

Figure 2:
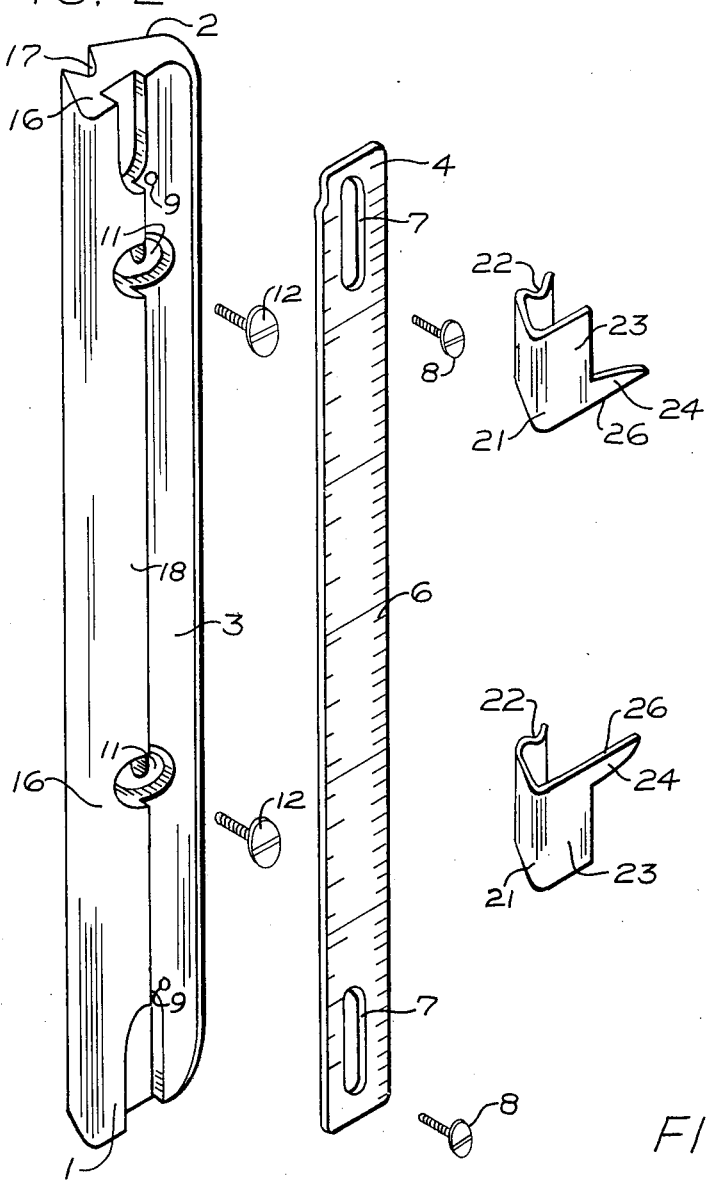
FIG. 2 is a developed view of the gauge.
Figure 3:
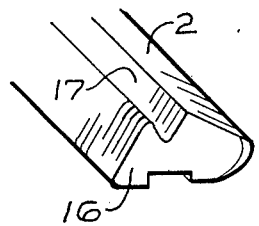
FIG. 3 is a fragmented end view of the gauge body.
Figure 4:
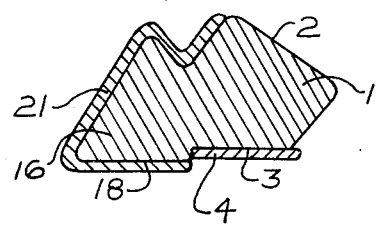
FIG. 4 is a cross-sectional view of the gauge.

The gauge herein has a gauge body 1 with a flat bottom 2 and a flat top surface 3 on which latter is a scale element 4. The graduations of scale 6 on the scale element may be in inches or in the metric system. For example, viewing FIG. 2, along the right edge the scale reads in tenths of inches and along the left side in centimeters.

Near each end of the scale element 4 is an elongated slot 7. Screws 8 extend through the slots 7 into threaded holes 9 in the top surface 3 for attaching the scale element to the gauge body 2 in an initial adjusted position. Countersunk holes 11 partly through the top surface 3 are for screws 12 for attaching the gauge body 1 to a machine part, such as the post 13 adjacent a drill shaft 14 of the drill press shown in FIG. 1.

A guide rail 16 is formed along one side of the gauge body 1. A longitudinal groove 17 is in the underside of the gauge body 1 between the guide rail 16 and the bottom 2. The groove is generally V-shaped cross-sectionally. The top surface 18 of the rail 16 is raised above the top surface 3 of the gauge body 1 and above the scale element 4. The cross-sectional shape of the guide rail 16 is generally triangular.

A pair of pointer members 21 are slidably fitting over the guide rail 16 and into the groove 17. Each pointer body is generally V-shaped, one leg of which has a lip 22 fitting into the groove 17, thereby to retain the pointer in position on the guide rail 16. From the other or top leg 23 of the pointer body projects a pointer finger 24 over the scale element 4. The pointer fingers 24 are on facing edges of the pointer bodies so that the pointer edges 26 face one another and accurately indicate on the scale 6 the distance between the pointers.

Figure 1:
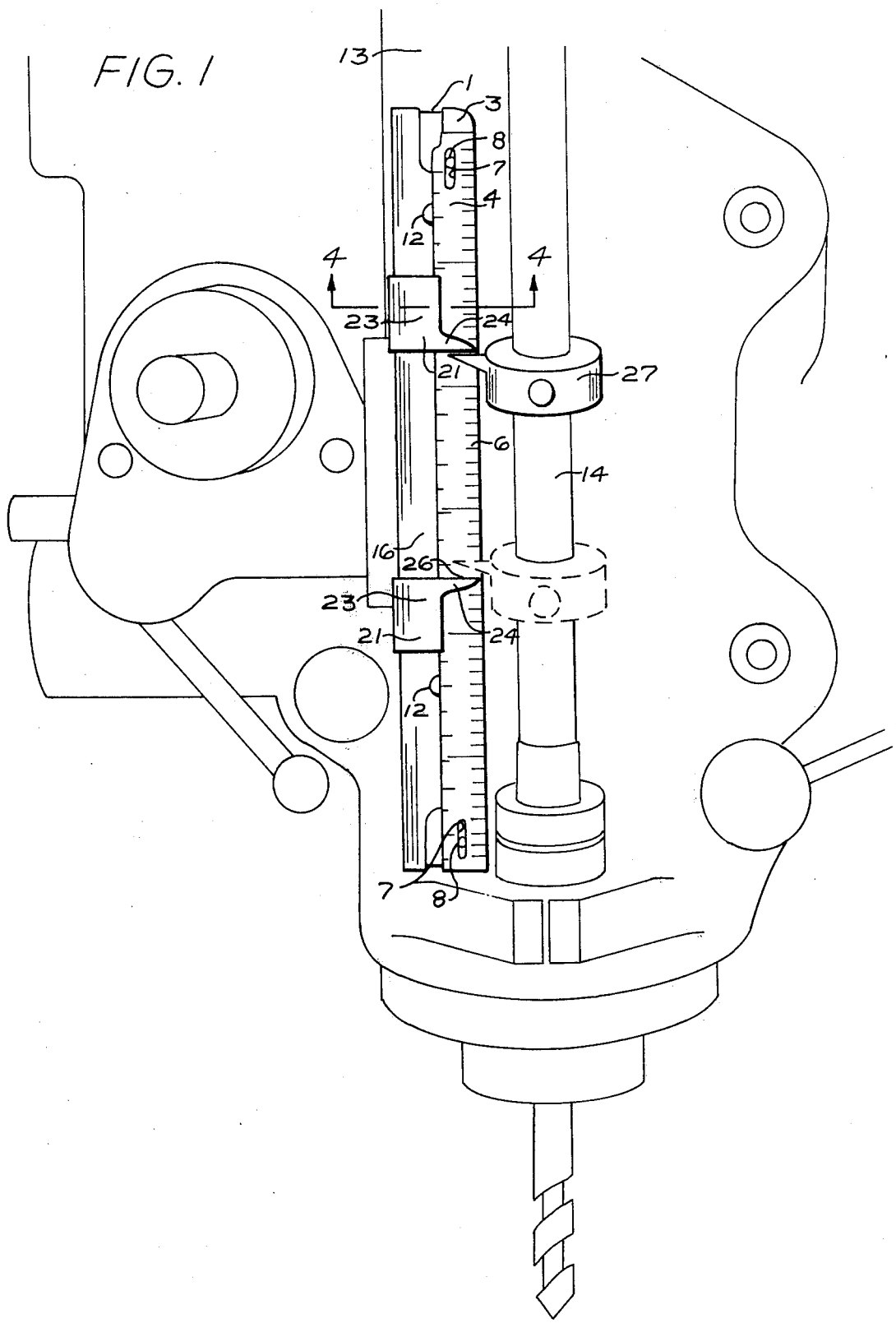
FIG. 1 is a view showing the gauge installed on a drilling machine.

A moving pointer extends from an adjacent machine part which moves longitudinally along the gauge, as shown in FIG. 1. This moving pointer 27 projects over the scale 6 and visually indicates the distance of relative movement of machine parts.

I claim:

1. A gauge comprising
   a scale element having a scale longitudinally marked thereon,
   a gauge body having a longitudinal bottom adapted to be placed on a surface and a longitudinal top spaced from said bottom accommodating said scale element thereon,
   a longitudinal guide rail extending laterally along said body,
   a pair of spaced pointer members, each member comprising a pointer body slidably supported along said guide rail and being selectively positioned thereon,
   a pointer finger projecting from each pointer body over said scale for indicating a predetermined distance between adjusted positions of said pointer members,
   and means to detachably secure said scale on said longitudinal top of said gauge body.

2. The gauge specified in claim 1, and
   said gauge body having a longitudinal groove adjacent said bottom along said rail, and said pointer body fitting cross-sectionally over the entire contour of said rail and in said groove.

3. The gauge specified in claim 1, and
   the cross-sectional contour of said guide rail including a longitudinal ridge, a groove between the ridge and said bottom, and said guide rail being of generally triangular cross-section having a top side parallel with and above said top of said gauge body, and said pointer member cross-sectionally conforming to said cross-sectional contour of said guide rail.

4. The gauge specified in claim 1, and
   said scale element having a longitudinal slot near each end thereof,
   and fastening elements extended through said slots being adjustably fastened in said top side of said gauge body.

5. The gauge specified in claim 4, and
   said gauge body having holes therethrough accommodating fastening elements for securing said gauge body in place on said surface.

6. The gauge specified in claim 4, and
   a moveable pointer adapted to be secured to a moveable body extending over said scale element and between said pointer fingers thereby to indicate the distance of relative movement of said moveable body.

7. The gauge specified in claim 1, and
   said scale having parallel and aligned English and metric scales thereon.

* * * * *